United States Patent [19]

Leiberoth-Leden et al.

[11] Patent Number: 5,072,708
[45] Date of Patent: Dec. 17, 1991

[54] ENGINE CONTROL DEVICE

[75] Inventors: Bernd Leiberoth-Leden, Leonberg; Rainer Norgauer, Stuttgart, both of Fed. Rep. of Germany

[73] Assignee: Robert Bosch GmbH, Stuttgart, Fed. Rep. of Germany

[21] Appl. No.: 671,613

[22] Filed: Mar. 19, 1991

[30] Foreign Application Priority Data

May 14, 1990 [DE] Fed. Rep. of Germany ....... 4015423

[51] Int. Cl.⁵ .............................................. F02D 7/00
[52] U.S. Cl. .................................................. 123/399
[58] Field of Search ............... 123/399, 361, 340, 342; 74/513, 501.5 R; 180/178, 179, 197; 251/229; 261/65

[56] References Cited

U.S. PATENT DOCUMENTS

| | | | |
|---|---|---|---|
| 4,530,326 | 7/1985 | Mann et al. | 123/342 |
| 4,932,375 | 6/1990 | Burney | 123/361 |
| 4,938,190 | 7/1990 | McCabe | 123/399 |
| 4,961,355 | 10/1990 | Irino et al. | 74/513 |
| 4,969,437 | 11/1990 | Kolb | 123/399 |
| 4,986,238 | 1/1991 | Terazawa | 123/361 |

*Primary Examiner*—Raymond A. Nelli
*Attorney, Agent, or Firm*—Edwin E. Greigg; Ronald E. Greigg

[57] ABSTRACT

An engine control device proposed for transmitting a control motion of an accelerator to an actuator of an engine, which includes mechanical transmission means and electrical transmission means with two clearances related to the accelerator. The two clearances are at the beginning and end of the mechanical transmission means so that the accelerator during normal driving can be actuated with particularly small forces, and at the same time reliable restoration of the accelerator is assured. The engine control device is particularly suitable for motor vehicles having traction control as well as travel speed control.

20 Claims, 1 Drawing Sheet

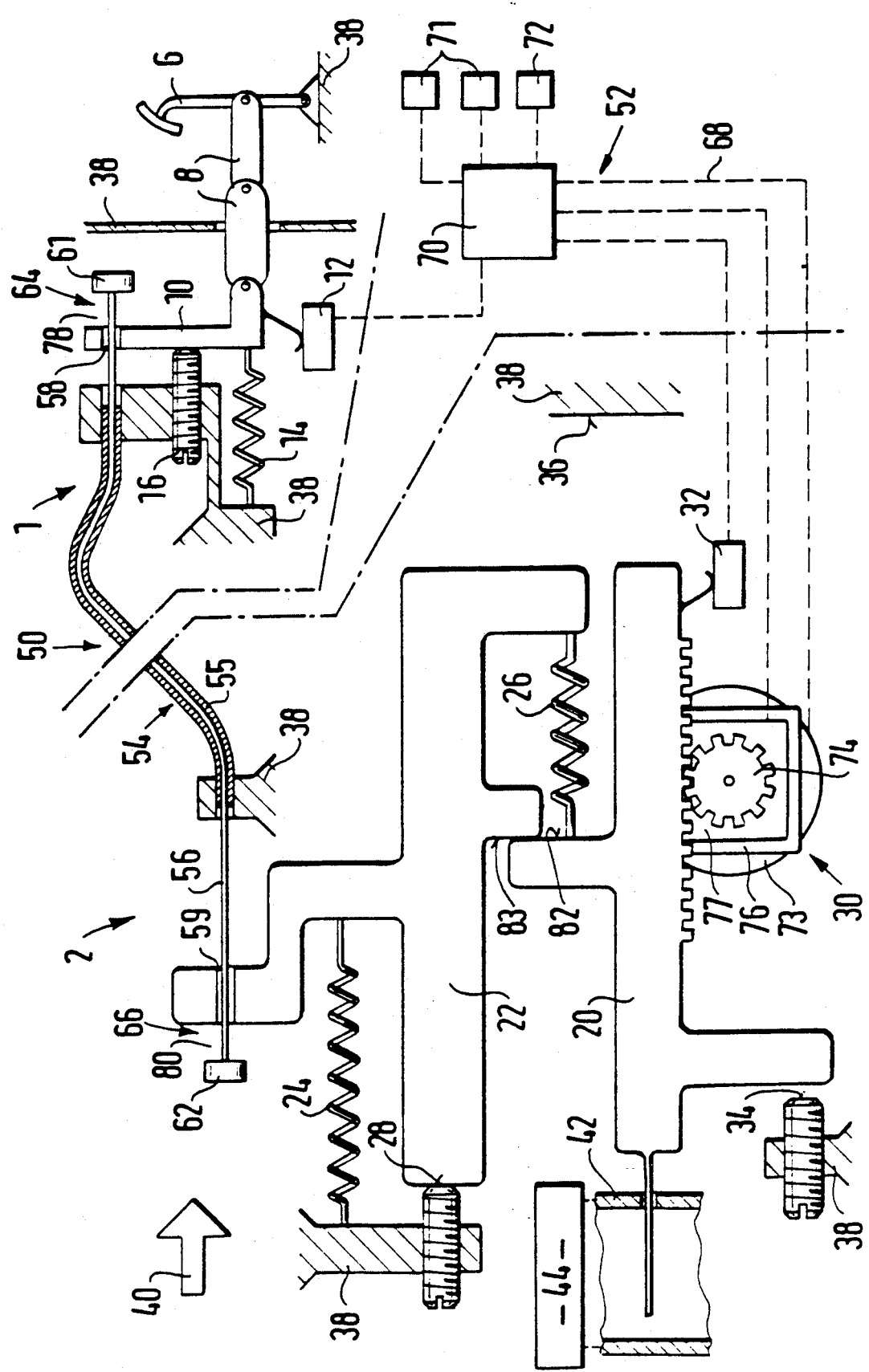

ENGINE CONTROL DEVICE

BACKGROUND OF THE INVENTION

The invention is based on an engine control device.

In a known engine control device, a return of the accelerator to its outset position is not assured under all operating conditions, for example when there is increased friction because of severe cold. Furthermore, in normal driving the accelerator is actuated counter to a strong restoring force.

OBJECT AND SUMMARY OF THE INVENTION

By comparison with the prior art, the device according to the invention has the following advantages in particular:

The restoring spring to restore the accelerator can advantageously be weak.

It is advantageously assured that a set-point transducer serving to detect a position of the accelerator can recognize the actual actuation state of the accelerator under all circumstances, and especially including that in which the accelerator is not actuated.

The engine control device according to the invention offers an opportunity of designing the construction such that the accelerator can advantageously be actuated with extraordinarily little force.

To adjust the actuator in the direction of less engine power, it is advantageous that only a relatively weak restoring spring is needed. The mechanical transmission means that connect the second control group to the first control group advantageously need to transmit forces in only one direction. This is especially advantageous if the mechanical transmission means are embodied in the form of a Bowden cable, because for the Bowden cable it is favorable if no compressive forces of any kind have to be transmitted as a result.

To adjust the actuator with the aid of the control drive, only slight forces or adjusting moments are advantageously necessary.

Automatic vehicle speed control advantageously has no effect on the mechanical transmission means.

Further advantages and improvements are attained with the provisions set forth herein.

With the aid of a disconnecting point and a coupling spring between a second link element and an actuator, the actuator can advantageously be adjusted by a control drive in a direction of reduced engine power, without hindrance from the accelerator.

If the restoring spring engages the link element, this advantageously makes it possible to use a relatively weak coupling spring.

Safe emergency operation of the engine is advantageously assured by an emergency operation stop, on which a second link element can come to rest.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing, in simplified form, shows an exemplary embodiment of the invention.

DESCRIPTION OF THE PREFERRED EMBODIMENT

The structure and mode of operation of an engine control device embodied according to the invention in a vehicle, for transmitting a control position of an accelerator to a control position of an actuator that determines engine power will now be described in detail in terms of an exemplary embodiment, shown in the drawing.

The engine control device according to the invention substantially includes a first control group 1 and a second control group 2. For the sake of clarity, two dot-dash lines are shown in the drawing, extending between the first control group 1 and the second control group 2.

The first control group 1 substantially includes an accelerator pedal 6, a transmission element 8 or a plurality of transmission elements 8, a first link element 10, a set-point transducer 12 or a plurality of set-point transducers 12, a restoring spring 14, and an adjustable repose stop 16.

The second control group 2 substantially includes an actuator 20, a second link element 22, a restoring spring 24, a coupling spring 26, an emergency operation stop 28, a control drive 30, an actual-value transducer 32 plurality of actual-value transducers 32, an end stop 34, and a full-load stop 36.

Individual elements that are fixed parts of the vehicle and cooperate with the engine control device according to the invention will hereinafter be called the base 38. The repose stop 16, the emergency operation stop 28, the end stop 34 and the full-load stop 36 are provided on the base 38, or are adjustable with respect to the base 38, for instance with the aid of adjusting screws.

An arrow 40 is shown in the drawing. The direction of motion of the accelerator 6, transmission elements 8, first link element 10, second link element 22 and actuator 20 extend parallel to the arrow 40.

The position of the actuator 20 determines an open cross section in an intake tube 42. Thus, via the actuator 20, a fuel-air flow to an engine 44, and thus the power of the engine 44, can be controlled. An adjustment of the actuator 20 in the direction of the arrow 40 signifies an enlargement of the open cross section in the intake tube 42 and hence an increase in the power of the engine 44, and an adjustment of the actuator 20 counter to the arrow 40 signifies a reduction in power of the engine 44.

The second control group 2 is connected to the first control group 1 via mechanical transmission means 50 and electrical transmission means 52.

In the exemplary embodiment shown, the mechanical transmission means 50 include a Bowden cable 54 with a Bowden cable sheath 55 and a Bowden cable cord 56. The first link element 10 has a recess or aperture 58, and the second link element 22 has a recess or aperture 59. The cord 56 extends through the two recesses 58, 59. On the side of the first link element 10 remote from the second link element 22, the cord 56 has a first thickened end portion 61, and it has a second thickened end portion 62 on the side of the second link element 22 remote from the first link element 10. The two thickened portions 61, 62 are embodied such that during operation of the engine control device, they cannot slip out through the respective recesses 58 and 59. The Bowden cable jacket 55 is affixed to the base 38 and carries the cord 56.

The first link element 10 is connected to the accelerator 6 via the transmission elements 8. However, it is also possible for the first link element 10 to be directly connected to the accelerator 6, or the recess 58 may be provided for direct coupling of the mechanical transmission means 50 to the accelerator 6. The set-point transducer 12 is provided such that it ascertains the position of the accelerator 6 directly or indirectly.

The restoring spring 14 acts at one end on the base 38 and at the other on the first link element 10 and thus on the transmission elements 8 and accelerator 6 counter to the arrow 40. When the accelerator 6 is not actuated, the restoring spring 14 adjusts the accelerator 6, transmission elements 8 and first link element 10 counter to the arrow 40, until the link element 10 or the transmission elements 8 or the accelerator comes to rest on the repose stop 16.

In the region of the end having the first thickened portion 61, the cord 56 and the first link element 10 having the recess 58 form a first clearance 64. In the vicinity of the other end of the Bowden cord 56 having the second thickened portion 62, in cooperation with the second link element 22 and the recess 59, a second clearance 66 is formed. The first clearance 64 is embodied such that no forces, or virtually no significant forces can be transmitted from the cord 56 to the first link element 10 in the direction of the arrow 40, or from the first link element 10 to the cord 56 counter to the arrow 40. The second clearance 66 is embodied such that no forces, or virtually no forces can be transmitted from the cord 56 to the second link element 22 counter to the arrow 40, or from the second link element 22 to the cord 56 in the direction of the arrow 40.

Particularly because of the clearance 64, the restoring spring 14 can be weak, yet secure restoration of the accelerator 6 when the accelerator 6 is not actuated is nevertheless assured. Thus, an unintentional sticking of the accelerator 6 in a position corresponding to partial or full load of the engine 44 is advantageously precluded, and the set-point transducer 12 is advantageously always capable of recognizing the genuine intentions of the driver. The danger that mechanical components may stick is reduced to a minimum.

The electrical transmission means 52 include electric lines 68 and an electric control means 70, and normally also sensor 71 or a plurality of sensors 71 and a transducer 72. The sensors 71 serve for example to detect drive slip between driven wheels and a surface on which the vehicle is traveling, to detect a temperature and/or rpm of the engine 44, a travel speed of the vehicle, or some other variable that is intended to have some influence on the control of the engine 44. The electric lines 68 are shown as dashed lines in the drawing, for simplicity. The control drive 30 includes a control motor 73 and a pinion 74 driven by the control motor 73. If needed, a gear 76 and/or a shiftable clutch 77 can be interposed between the control motor 73 and the pinion 74. The set-point transducer 12, the actual-value transducer 32, the sensor 71, the transducer 72, the control motor 73 and the shiftable clutch 77 are connected to the electric control means 70 via the lines 68.

Depending on the position of the accelerator 6, the set-point transducer 12 emits a control signal to the control means 70. This control signal is compared with a control signal output by the actual-value transducer 32, and the control motor 73 of the control drive 30 is triggered accordingly until the actuator 20 has assumed the position corresponding to the position of the accelerator 6. The position of the actuator 20 can also be influenced by the sensor 71 and the transistor 72. The transmission of the position of the accelerator 6 to the actuator 20 can be done with the aid of various transmission functions. The transmission functions can for example be selected to be linear, progressive, degressive, or otherwise, as needed.

Depending on the position of the first link element 10 and Bowden cord 56, there is a more or less large first actuation play 78 between the first link element 10 and the first thickened portion 61. Depending on the position of the Bowden cord 56 and the second link element 22, there is a more or less large second actuation play 80 between the second link element 22 and the second thickened portion 62. The sum of the first actuation play 78 and the second actuation play 80 will hereinafter simply be called play.

The restoring spring 24 acts at one end on the base 38 and at the other on the second link element 22 and urges the second link element 22 toward the emergency operation stop 28, counter to the arrow 40. The coupling spring 26 acts at one end on the actuator 20 in the direction of the arrow 40 and at the other on the second link element 22 counter to the arrow 40, urging a coupling stop 82 provided on the actuator 20 toward a coupling stop 83 provided on the second link element 22.

When the accelerator is in the position of repose, if the actuator 20 is not engaged via the control drive 30, the second link element 22 rests on the emergency stop 28, and the coupling stop 82 rests on the coupling stop 83. In that case, the power of the engine 44 is determined by the emergency operation stop 28. The emergency operation stop is preferably set such that the engine 44 will reliably operate with sufficient rpm under all conditions, for example including severe cold. The power of the engine 44 is determined by the emergency operation stop 28 only in the case of emergency, because with the aid of the control drive 30, as desired and depending on the data ascertained by the sensors 71, the rpm of the engine 44 can be raised and lowered even when the accelerator 6 is not actuated. If the rpm is to be lowered, then the control drive 30 can actuate the actuator 20 counter to the coupling force of the coupling spring 26, or in other words counter to the arrow 40. The coupling stop 82 in that case lifts away from the coupling stop 83. The power of the engine 44 can also be raised, however. This is done in that the control drive 30 actuates the actuator 20 in the direction of the arrow 40, counter to the force of the restoring spring. 24 The second link element 22 then lifts away from the emergency operation stop 28. Because of the clearance 66, an adjustment of the actuator 20 with the aid of the control drive 30 in the direction of higher power has no influence on the Bowden cord 56 of the mechanical transmission means 50.

A distinction is made below between normal driving operation and emergency operation. During normal driving, an actuation of the accelerator 6 by the first control group 1 via the electrical transmission means 52 is transmitted to the actuator 20 of the second control group 2 with the aid of the control drive 30. If the electrical transmission means 52 or the control drive 30 should fail for any reason whatever, then in emergency operation an actuation of the accelerator 6 can be transmitted to the second control group 2 and hence to the actuator 20 via the mechanical transmission means 50.

During normal driving, if the accelerator 6 is actuated, then a corresponding electrical adjustment signal is delivered to the control drive 30, and the control drive 30 adjusts the actuator 20 in accordance with the transmission function input to the electric control means 70. The play composed of the two actuation plays 78, 80 is selected to be preferably large enough, as a function of the transmission function input to the electric control means 70, that in every position of the accelerator 6 the play is greater than zero.

At the onset of an actuation of the accelerator 6 counter to the force of the restoring spring 14, the first link element 10 lifts away from the position of repose 16 first. Once the first actuation play 78 is overcome, the first link element 10 comes to rest on the first thickened portion 61. Upon further actuation of the accelerator 6 in the direction of the arrow 40, the Bowden cord 56 is also actuated via the first link element 10. However, since in normal driving the actuator 20 and the second link element 22 are likewise actuated in the direction of the arrow 40, with the aid of the control drive 30, the second thickened portion 62 of the Bowden cord 56 does not come to rest on the second link element 22. Thus, in normal driving the accelerator 6 must substantially be actuated only counter to the force of the restoring spring 14 and counter to the friction between the Bowden cord 56 and the Bowden cable jacket 55, in the direction of the arrow 40. This particularly slight actuation force is especially pleasant to the driver actuating the accelerator 6. When the accelerator 6 is released, the restoring spring 14 needs to overcome only the friction in the region of the first link element 10, the transmission elements 8, the set-point transducer 12, and the accelerator 6. This has the particular advantage that the restoring spring 14 can be embodied as relatively weak, yet nevertheless reliable restoration of the accelerator 6 and of the set-point transducer 12 counter to the arrow 40 is assured.

To actuate the accelerator 6 in emergency operation, or in other words if an adjustment of the actuator 20 with the aid of the control drive 30 is absent, then after the first actuation play 78 is overcome, the Bowden cord 56 is likewise actuated in the direction of the arrow 40. Once the second actuation play 80 between the thickened portion 62 and the second link element 22 has been overcome, the second link element 22 is actuated along with the actuator 20 counter to the force of the restoring spring 24, likewise in the direction of the arrow 40. With the engine control device according to the invention, the accelerator 6 needs to be actuated in emergency operation with only somewhat increased pedal force. Since emergency operation virtually never occurs, the increased pedal force during emergency operation is no disadvantage. To reduce the pedal forces in emergency operation, the clutch 77 is preferably shifted such that the control motor 73 and the gear 76 are uncoupled from the actuator 20.

Besides the modes of operation already described, automatic vehicle speed control is also possible. Via the transducer 72, a desired vehicle speed can be specified even when the accelerator 6 is not actuated. In that case, the control drive 30 adjusts the actuator 20 parallel to the arrow 40, until the sensor 71 ascertains that the desired travel speed has been attained. Each time the travel speed changes, the actuator 20 is correspondingly readjusted. Because of the second clearance 66, the control drive 30 advantageously has to overcome only the forces of friction in the vicinity of the actuator 20 and of the second link element 22 and the force of the restoring spring 24 in this process.

If a rapid reduction of the driving power of the engine 44 should be necessary during normal driving or during automatic vehicle speed control, for instance because one of the sensors 71 ascertains impermissibly high drive slip between driven wheels (not shown) and a road surface (also not shown), the control drive 30 can adjust the actuator 20 counter to the arrow 40 to the desired extent. It may happen in normal driving that the actuator 20 must be adjusted counter to the arrow 40 by more than the sum of the two actuation plays 78, 80. In that case, after the actuation plays 78, 80 have been overcome, the control drive 30 can actuate the actuator 20 counter to the arrow 40, counter to the coupling force of the coupling spring 26. The coupling stop 82 of the actuator 20 then lifts away from the coupling stop 83 of the second link element 22. Thus a reduction in the power of the engine 44 beyond the actuation plays 78, 80 is possible.

In the particularly advantageous engine control device according to the invention described by way of example here, the actuator 20 is adjustable relative to the second link element 22 counter to the arrow 40, counter to the force of the coupling spring 26. In a simplified version of the engine control device according to the engine, however, it is also possible to couple the actuator 20 firmly to the second link element 22. In this simplified version, the actuator 20 can be actuated counter to the arrow 40 with the aid of the control drive 30 only so far, as maximum, that the actuation plays 78, 80 are overcome. Furthermore, the control drive 30 can actuate the actuator 20 counter to the arrow 40 only as far as allowed by the driver using the accelerator.

In the exemplary embodiment shown, the mechanical transmission means 50 include the Bowden cable sheath 55 and the Bowden cable cord 56. Advantageously, only tensile forces are transmitted by the Bowden cable cord 56, and even slight compressive forces can be dispensed with. However, it is also possible to use an arbitrary cord instead of the Bowden cable cord 56 and rope pulleys, for instance, instead of the Bowden cable sheath 55. However, it is also possible to embody the mechanical transmission means 50 in the form of a rod linkage. The rod linkage can then for instance be embodied such that via the rod linkage, only tensile forces, or only compressive forces, for example, are transmitted. In each case, the clearances 64, 65 are provided in an inventive manner between the mechanical transmission means 50 and the control groups 1, 2.

With the aid of the transmission elements 8, it is possible to dispose the accelerator pedal 6 in the passenger compartment and the first link element 10, the set-point transducer 12 and the restoring spring 14 in the engine compartment. The transmission elements 8 may for instance be a cable or a rod linkage. It is also possible to dispose the restoring spring and/or the set-point transducer 12 directly on the accelerator pedal 6 In the drawing, a partition identified by reference numeral 88 is suggested between the passenger compartment and the engine compartment.

The engine control device according to the invention has been described above in terms of an exemplary embodiment in which the moving components can execute substantially rectilinear motions parallel to the arrow 40. It is equally possible, and in many applications more favorable, to support the second link element 22 and the actuator 20, for instance, rotatably on pivot shafts; it is particularly practical if all the axes are aligned in a single line. The actuator 20 and the second link element 22 in that case do not execute reciprocating motions parallel to the arrow 40, but instead execute more or less large swiveling motions about the pivot shaft. The control motion in the direction of the arrow 40 then represents a swiveling motion in one direction of rotation, for instance, and that counter to the arrow in that case means a swiveling motion in the opposite direction. All the components may be embodied as more or less round or curved.

When the engine 44 is an Otto engine, the actuator 20 is conventionally a pivotably supported throttle valve shaft, for example, with a throttle valve secured to it. A particularly elegant version is attained if the throttle valve shaft is disposed such that it protrudes on both ends from the intake tube 42. The second link element 22 can engage one end in the manner of a disk, and the control drive 30 can engage the throttle valve shaft on the other end. Since the power output shaft of the control drive 30 and the actuator 20 can both normally execute swiveling motions, the teeth symbolically shown in the drawing can normally be dispensed with. The restoring spring 14, the restoring spring 24 and/or the coupling spring 26 are each suitably a spiral spring. If the engine 44 is a Diesel engine, for example, then the actuator 20 may for instance be a control rod of an injection pump of the Diesel engine.

In the engine control device according to the invention, the forces or adjusting moments to be brought to bear by the control drive 30 are relatively small. It is thus advantageously possible to use a small control drive 30, or the gear ratio of the gear 76 can be selected as low, or upon adjustment of the actuator 20 with the aid of the control drive, advantageously short adjusting times may be achieved.

The play composed of the two actuation plays 78, 80 is less than a maximum adjustment range of the actuator 20. Advantageously, the play is approximately one-third the maximum adjustment range.

Upon acceleration, the Bowden cable cord 56 is actuated by the drive via the first link element 10, and upon deceleration it is actuated by the restoring spring 24 and the control drive 30 (during normal driving), or by the restoring spring 24 alone (in emergency operation), in each case after the actuation plays 78, 80 have been overcome. As a result, it is advantageously unnecessary to provide any spring to stiffen the Bowden cable cord 56. The omission of this spring advantageously brings about a particularly small actuating force in the Bowden cable cord 56 and thus a particularly low frictional force between the cord 56 and the Bowden cable sheath 55, because the force of friction increases approximately exponentially with the actuation force. This is additionally and advantageously expressed in particularly small forces or adjusting moments at the accelerator 6 and control drive 30.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. An engine control device in a vehicle, for controlling a power output of an engine (44), having a first control group (1), including an accelerator (6), a first link element (10) actuatable by the accelerator (6), a set-point transducer (12) for detecting a position of the accelerator (6), and a restoring spring (14) which returns the accelerator (6) to a position of repose, and having a second control group (2), including an actuator (20) that determines the power output and a second link element (22), a control drive (30) for adjusting the actuator (20) as a function of electrical adjustment signals, a restoring spring (24) which urges the actuator (20) in a direction of less power output, mechanical (50) and electrical (52) transmission means, via which a control command can be transmitted from the first control group (1) to the second control group (2), wherein the mechanical transmission means (50) are connected to the first link element (10) via a first clearance (64) that at most insignificantly hinders a motion of the first link element (10) in the direction of less power output of the engine (44), and said mechanical transmission means are connected to the second link element (22) via a second clearance (66) at most insignificantly hindering motion of the second link element (22) in the direction of greater power output of the engine (44), and wherein a play (78, 80) is present, at least in a region of one of the two clearances (64, 66), when a position of the actuator (20) corresponds to a position of the accelerator (6).

2. An engine control device as defined by claim 1, in which a disconnecting point (82, 83) is provided between the second link element (22) and the actuator (20), and a coupling spring (26) acts at one end on the second link element (22) and at the other end on the actuator (20), to urge a coupling stop (83) of the second link element (22) toward a coupling stop (82) of the actuator (20).

3. An engine control device as defined by claim 2, in which the restoring spring (24) engages the second link element (22).

4. An engine control device as defined by claim 2, in which upon adjustment of the second link element (22) in the direction of less power output, said second link element (22) can come to rest on an emergency operation stop (28).

5. An engine control device as defined by claim 3, in which upon adjustment of the second link element (22) in the direction of less power output, said second link element (22) can come to rest on an emergency operation stop (28).

6. An engine control device as defined by claim 2, in which said actuator (20) is adjustable counter to a force of the coupling spring (26) with an aid of the control drive (30) in the direction of less power output, until the actuator (20) comes to rest on an end stop (34).

7. An engine control device as defined by claim 3, in which said actuator (20) is adjustable counter to a force of the coupling spring (26) with an aid of the control drive (30) in the direction of less power output, until the actuator (20) comes to rest on an end stop (34).

8. An engine control device as defined by claim 4, in which said actuator (20) is adjustable counter to a force of the coupling spring (26) with an aid of the control drive (30) in the direction of less power output, until the actuator (20) comes to rest on an end stop (34).

9. An engine control device as defined by claim 1, in which said actuator (20) is adjustable counter to a force of the restoring spring (24) with an aid of the control drive (30) in the direction of greater power output, until the actuator (20) or the second link element (22) comes to rest on a full-load stop (36).

10. An engine control device as defined by claim 2, in which said actuator (20) is adjustable counter to a force of the restoring spring (24) with an aid of the control drive (30) in the direction of greater power output, until the actuator (20) or the second link element (22) comes to rest on a full-load stop (36).

11. An engine control device as defined by claim 3, in which said actuator (20) is adjustable counter to a force of the restoring spring (24) with an aid of the control drive (30) in the direction of greater power output, until the actuator (20) or the second link element (22) comes to rest on a full-load stop (36).

12. An engine control device as defined by claim 4, in which said actuator (20) is adjustable counter to a force of the restoring spring (24) with an aid of the control drive (30) in the direction of greater power output, until the actuator (20) or the second link element (22) comes to rest on a full-load stop (36).

13. An engine control device as defined by claim 6, in which said actuator (20) is adjustable counter to a force of the restoring spring (24) with an aid of the control drive (30) in the direction of greater power output, until the actuator (20) or the second link element (22) comes to rest on full-load stop (36).

14. An engine control device as defined by claim 1, in which the play (78, 80) is less than a maximum adjustment range of the actuator (20).

15. An engine control device as defined by claim 2, in which the play (78, 80) is less than a maximum adjustment range of the actuator (20).

16. An engine control device as defined by claim 3, in which the play (78, 80) is less than a maximum adjustment range of the actuator (20).

17. An engine control device as defined by claim 4, in which the play (78, 80) is less than a maximum adjustment range of the actuator (20).

18. An engine control device as defined by claim 6, in which the play (78, 80) is less than a maximum adjustment range of the actuator (20).

19. An engine control device as defined by claim 9, in which the play (78, 80) is less than a maximum adjustment range of the actuator (20).

20. An engine control device as defined by claim 14, in which the play (78, 80) amounts to approximately one-third of the maximum adjustment range.

* * * * *